United States Patent

Azadeh

(10) Patent No.: US 8,901,474 B2
(45) Date of Patent: Dec. 2, 2014

(54) ENHANCED RECEIVED SIGNAL POWER INDICATORS FOR OPTICAL RECEIVERS AND TRANSCEIVERS, AND METHODS OF MAKING AND USING THE SAME

(75) Inventor: Mohammad Azadeh, Northridge, CA (US)

(73) Assignee: Source Photonics, Inc., Chatsworth, CA (US)

( * ) Notice: Subject to any disclaimer, the term of this patent is extended or adjusted under 35 U.S.C. 154(b) by 106 days.

(21) Appl. No.: 13/527,462

(22) Filed: Jun. 19, 2012

(65) Prior Publication Data

US 2013/0336650 A1   Dec. 19, 2013

(51) Int. Cl.
*H04B 10/40* (2013.01)
*H03F 3/45* (2006.01)
*H04B 10/079* (2013.01)

(52) U.S. Cl.
CPC ............ *H04B 10/40* (2013.01); *H04B 10/0799* (2013.01)
USPC ........... 250/214 A; 398/38; 398/135; 330/288

(58) Field of Classification Search
CPC ........... H04B 10/0799; H04B 10/0795; H04B 10/0793; H04B 10/079; H04B 10/07; H04B 10/40
USPC ..... 250/214 A, 214 L, 214 R, 206; 398/9, 25, 398/26, 37, 38, 135–139; 330/288
See application file for complete search history.

(56) References Cited

U.S. PATENT DOCUMENTS

| | | | |
|---|---|---|---|
| 4,085,411 A * | 4/1978 | Genesi | 396/228 |
| 5,535,038 A * | 7/1996 | Hinch | 398/182 |
| 6,852,966 B1 * | 2/2005 | Douma et al. | 250/214 AG |
| 6,888,123 B2 * | 5/2005 | Douma et al. | 250/214 R |
| 6,930,300 B1 * | 8/2005 | Douma et al. | 250/214 A |
| 7,200,336 B2 | 4/2007 | Yu et al. | |
| 7,457,335 B2 * | 11/2008 | Randlett | 372/38.02 |
| 7,608,806 B2 * | 10/2009 | Draper et al. | 250/205 |
| 7,646,990 B2 * | 1/2010 | Weber et al. | 398/197 |
| 7,650,077 B2 | 1/2010 | Yu et al. | |
| 7,860,398 B2 * | 12/2010 | Tatum et al. | 398/141 |
| 8,073,343 B2 * | 12/2011 | Yuki et al. | 398/202 |
| 8,200,083 B2 * | 6/2012 | Effenberger et al. | 398/38 |
| 8,320,420 B2 * | 11/2012 | Brown et al. | 372/38.07 |
| 8,346,100 B2 * | 1/2013 | Cerisola et al. | 398/209 |
| 8,450,676 B2 * | 5/2013 | Christensen | 250/214 R |

(Continued)

OTHER PUBLICATIONS

University of Wisconsin, "Experiment 12: Non-linear Operational Amplifier Circuits", Nov. 30, 2009, University of Wisconsin, pp. 1-2.*

(Continued)

*Primary Examiner* — John Lee
(74) *Attorney, Agent, or Firm* — Andrew D. Fortney; Central California IP Group, P.C.

(57) ABSTRACT

An optical transceiver and/or optical network, and methods of monitoring optical transceivers, may be useful for increasing the dynamic range and/or determining the received signal strength and/or link budget of the optical transceiver and/or a different optical transceiver in the optical network. The circuitry generally comprises a photodiode configured to generate a first current responsive to an optical signal, a current mirror configured to produce a second current equal or proportional to the first current, and a nonlinear element configured to produce a first voltage from the first current.

22 Claims, 9 Drawing Sheets

(56) References Cited

U.S. PATENT DOCUMENTS

| | | | |
|---|---|---|---|
| 2003/0161640 A1* | 8/2003 | Kimura | 398/202 |
| 2004/0161239 A1* | 8/2004 | Bruesselbach et al. | 398/131 |
| 2005/0031357 A1 | 2/2005 | Soto et al. | |
| 2005/0121632 A1* | 6/2005 | Chieng et al. | 250/559.1 |
| 2005/0195038 A1* | 9/2005 | Neenan et al. | 330/308 |
| 2005/0232635 A1* | 10/2005 | Aronson et al. | 398/135 |
| 2006/0108510 A1* | 5/2006 | Draper et al. | 250/214.1 |
| 2006/0222370 A1* | 10/2006 | DeCusatis et al. | 398/135 |
| 2006/0239687 A1* | 10/2006 | Gopinath | 398/115 |
| 2007/0023615 A1* | 2/2007 | Ruegg et al. | 250/214 R |
| 2007/0058976 A1* | 3/2007 | Tatum et al. | 398/99 |
| 2007/0058989 A1* | 3/2007 | Kaku et al. | 398/209 |
| 2008/0007344 A1* | 1/2008 | Natzke | 330/308 |
| 2008/0056731 A1* | 3/2008 | Weber et al. | 398/197 |
| 2008/0101802 A1* | 5/2008 | Yano | 398/202 |
| 2008/0138092 A1* | 6/2008 | Nagakubo | 398/202 |
| 2008/0304824 A1* | 12/2008 | Barbieri et al. | 398/38 |
| 2009/0050791 A1* | 2/2009 | Teeter et al. | 250/214 R |
| 2009/0200450 A1* | 8/2009 | Nomura | 250/206 |
| 2009/0285579 A1* | 11/2009 | Neenan et al. | 398/136 |
| 2010/0098413 A1* | 4/2010 | Li et al. | 398/38 |
| 2010/0183296 A1 | 7/2010 | De Langen et al. | |
| 2010/0295538 A1* | 11/2010 | Okada | 324/96 |
| 2011/0085800 A1* | 4/2011 | Cerisola et al. | 398/38 |
| 2011/0091219 A1* | 4/2011 | Tatum et al. | 398/142 |
| 2011/0099601 A1* | 4/2011 | Riggsby et al. | 725/127 |
| 2012/0045201 A1* | 2/2012 | Skubic et al. | 398/38 |
| 2012/0099857 A1* | 4/2012 | Zhang et al. | 398/38 |
| 2012/0177367 A1* | 7/2012 | Miller | 398/37 |
| 2012/0183297 A1* | 7/2012 | Rohde et al. | 398/90 |
| 2012/0224598 A1* | 9/2012 | Brown et al. | 372/38.07 |
| 2013/0016965 A1* | 1/2013 | Christensen | 398/25 |
| 2013/0259471 A1* | 10/2013 | Wang | 398/38 |
| 2013/0287392 A1* | 10/2013 | Heimbuch et al. | 398/38 |
| 2013/0336650 A1* | 12/2013 | Azadeh | 398/38 |

OTHER PUBLICATIONS

Mark Heimbuch; "Methods, Apparatuses, and Systems for Monitoring Signal Strength in an Optical Network"; U.S. Appl. No. 13/316,238, filed Dec. 9, 2011.

* cited by examiner

ENHANCED RECEIVED SIGNAL POWER INDICATORS FOR OPTICAL RECEIVERS AND TRANSCEIVERS, AND METHODS OF MAKING AND USING THE SAME

FIELD OF THE INVENTION

The present invention generally relates to the field of optical transceivers, optical data communications and network technology. More specifically, embodiments of the present invention pertain to methods, architectures, circuits, and/or systems for monitoring optical devices, including optical transmitters and transceivers.

DISCUSSION OF THE BACKGROUND

Figure 1:
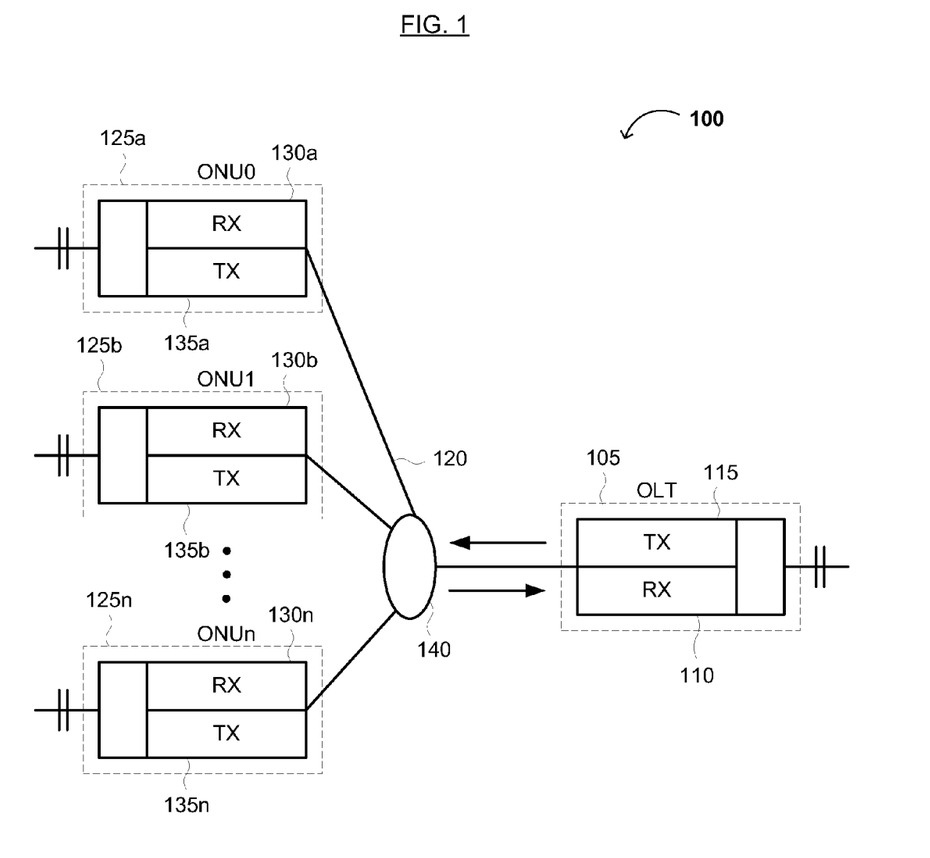
FIG. 1 is diagram showing a passive optical network.

Referring to FIG. 1, a passive optical network (PON) 100 provides for the optical transmission of data between a central office and one or more users. Typically, the central office comprises an optical line terminal (OLT) 105 or optical transceiver that transmits and receives optical data via fiber optic media between the OLT 105 and a user node (e.g., 125a, 125b, . . . or 125n), which utilizes a transceiver often referred to as either an optical network unit (ONU) or optical network terminal (ONT).

In the optical network 100, the OLT 105 and the ONU(s) 125a-n attempt to keep their respective transceivers transmitting optical signals at consistent power levels. However, in addition to (1) the distance between the transceivers and (2) the proper functioning of components in the transceivers and in the network 100, there exist other factors which may result in variations in the power levels of optical signals received by the receiver 110, 130 of an OLT 105 or ONU 125, respectively. By way of illustration and not limitation, some reasons for link loss include variations in transmitter operation, the presence of intervening components 140 (e.g., cables, splitters, couplers, etc.), and the use of splices. For example, link loss may result from variations in the power level of the optical signals received by the OLT 105 and ONU(s) 125a-n. If the OLT 105 and/or ONU(s) 125a-n receive optical signals at improper power levels (for example, too high or too low), the data may not be properly communicated or processed. To ensure proper and/or consistent communication, it is advantageous to ensure that the power level of the input optical signals remain within the dynamic range of the receiver of the OLT 105 and ONU(s) 125.

An inaccurately detected and/or processed optical signal by the OLT 105 and/or ONU(s) 125a-n can lead to erroneous processing of the received data by receiver circuitry 110, 130a-n. Increasing the gain of a signal may improve the detection and/or processing of the optical signal and/or the accuracy of the received data. However, large signals do not need much gain; in fact, it may not be desirable to increase the gain of a strong signal, as it may cause saturation during subsequent stages of processing the signal.

In order to determine if the optical transceiver is functioning correctly, various operational parameters relating to the optical signal may be monitored. In optical transceivers, the detection of input and/or output power may allow users to monitor information of the transceiver and ensure adequate performance and proper operation. However, the measurement for received signal strength must be performed relatively quickly. Traditional power measurement circuitry for determining received signal strength may be relatively slow, and its accuracy may diminish in instances of low current and/or short optical data transmission time frames. Further, any filter added to the power supply of the photodetector can slow down the response time of the power measurement circuitry. Typical power measurement circuitry also tends to be linear, and thus, may have a limited dynamic range.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention pertain to methods, architectures, circuits, optical transceivers and/or receivers and/or systems for communicating with and/or monitoring optical devices, including optical transmitters and transceivers.

In one embodiment, the present circuit may include a photodiode (PD) configured to generate a first current responsive to an optical signal, a current mirror (CM) configured to produce a second current equal to or proportional to the first current, and a nonlinear element configured to produce a first voltage from the second current. In various implementations, the nonlinear element may comprise a logarithmic amplifier, a gain amplifier, a first diode, a segmented linear amplifier, or a segmented nonlinear resistor. The segmented nonlinear resistor may comprise a first resistive segment and a second resistive segment. The first resistive segment generally comprises a first resistor, and the second resistive segment may comprise a second resistor and a diode. The segmented nonlinear resistor may further comprise additional resistive segments comprising one or more resistors and/or diodes. Optionally, the nonlinear element comprises a passive nonlinear element and an operational amplifier (op amp). In still further embodiments, the circuit may further comprise a transimpedance amplifier and/or an RF detector.

Another embodiment of the present circuit may comprise a photodiode configured to generate (i) an electrical signal and (ii) a first current in response to an optical signal, a nonlinear element coupled to the photodiode and configured to generate a first voltage proportional to the first current, and a first amplifier configured to amplify the electrical signal. In one embodiment, the nonlinear element comprises a passive nonlinear device coupled to a terminal of the photodiode and an operational amplifier configured to detect a voltage differential across the passive nonlinear device (e.g., receiving a first input from a first terminal of the passive nonlinear device and a second input from a second terminal of the passive device). In various implementations, the passive device comprises a diode, and optionally, a resistor. In further embodiments, the first amplifier may comprise a transimpedance amplifier and/or an RF detector.

Another aspect of the present invention relates to an optical transceiver, comprising an optical receiver configured to receive optical information, one of the circuits discussed above, and logic configured to determine or calculate a signal strength value and/or a link budget from (i) the first voltage and (ii) a second voltage at an output of an amplifier directly and/or indirectly receiving the electrical signal from the photodetector.

Another aspect of the present invention relates to a method for monitoring one or more optical transceivers, the method comprising receiving and/or sending one or more optical signals, converting the optical signal(s) into a first current, converting the first current into a first voltage using a nonlinear element, and calculating a received signal strength, a dynamic range, and/or a link budget based on the first voltage. In a further embodiment, the method may further comprise transmitting a flag and/or state corresponding to a value range of the received signal strength, dynamic range or link budget to the network or host.

Embodiments of the present invention advantageously provide circuitry and an optical and/or optoelectronic receiver and/or transceiver capable of generating a wide dynamic range for successfully receiving and processing optical signals and/or for quickly evaluating and/or determining a Received Signal Strength Indication (RSSI) and/or a link budget (e.g., as part of a digital diagnostic monitoring interface [DDMI]). Various embodiments and/or examples disclosed herein may be combined with other embodiments and/or examples, as long as such a combination is not explicitly disclosed herein as being unfavorable, undesirable or disadvantageous. These and other advantages of the present invention will become readily apparent from the description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Furthermore, all characteristics, measures or processes disclosed in this document, except characteristics and/or processes that are mutually exclusive, can be combined in any manner and in any combination possible. Any characteristic disclosed in the present specification, Claims, Abstract and Figures can be replaced by other equivalent characteristics or characteristics with similar objectives, purposes and/or functions, unless specified otherwise. Each characteristic is generally only an embodiment of the invention disclosed herein.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

For the sake of convenience and simplicity, the terms "optical signal" and "light" are generally used interchangeably herein, and use of either of these terms also includes the other, unless the context clearly indicates otherwise. Similarly, the following groups of terms are generally used interchangeably herein, and the use of any one of these terms also includes the others, unless the context clearly indicates otherwise:

"optical" and "optoelectronic";
"optical device," "optoelectronic device," "optical transceiver" and "optoelectronic transceiver";
"transmitter" and "transceiver"; and
"receiver" and "transceiver".

Also, for convenience and simplicity, the terms "connected to," "coupled with," "coupled to" and "in communication with" (which terms also refer to direct and/or indirect relationships between the connected, coupled and/or communicating elements unless the context of the term's use unambiguously indicates otherwise) may be used interchangeably, but these terms are also generally given their art-recognized meanings.

The invention, in its various aspects, will be explained in greater detail below with regard to exemplary embodiments.

An Exemplary Circuit

In a first aspect of the present invention, the circuit may include a photodiode configured to generate a first current responsive to an optical signal, a current mirror configured to produce a second current equal to or proportional to the first current, and a nonlinear element, configured to produce a first voltage from the second current.

Figure 2A:
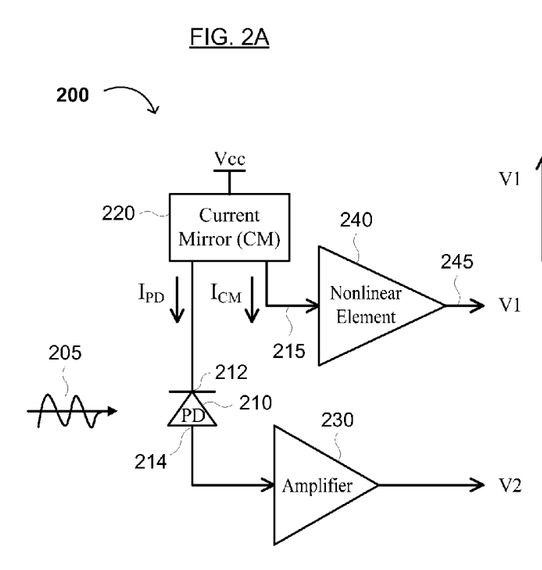
FIG. 2A is a diagram showing a first exemplary circuit according to embodiments of the present invention.

FIG. 2A illustrates exemplary circuit 200 in accordance with the present invention. Circuit 200 may form part of the circuitry and/or components of an optical receiver and/or transceiver. Circuit 200 comprises a photodiode (PD) 210, a current mirror (CM) 220, a nonlinear element 240, and an amplifier 230. PD 210 can comprise a p-type/intrinsic/n-type (PIN) diode, an avalanche photodiode or any other component or device configured to receive an optical signal and convert the received optical signal into an electrical signal. The CM 220 comprises circuitry configured to duplicate and/or replicate a first current (e.g., $I_{PD}$) at another node 215 (e.g., $I_{CM}$).

Figure 7A:
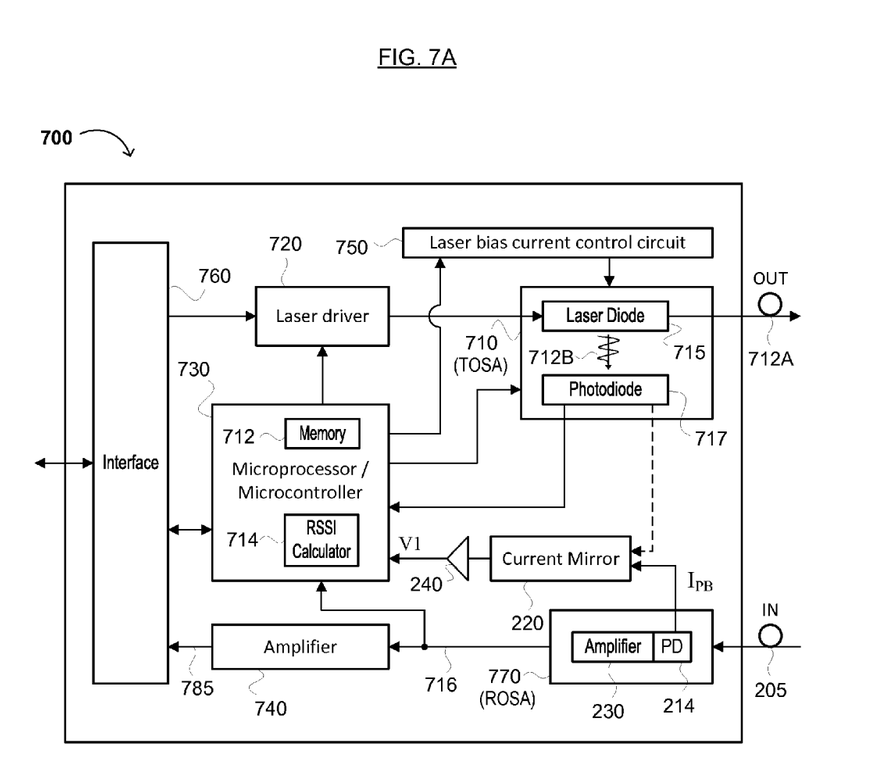
FIG. 7A is a diagram showing a first exemplary optical transceiver according to embodiments of the present invention.

The PD 210 converts a received optical signal 205 from one or more external components (such as one or more OLTs and/or ONUs) in a network into an electrical signal. Alternatively, PD 210 and/or another photodiode convert a portion of the optical signal sent from the transmitter of the optical transceiver into an electrical signal. The CM 220 replicates or mirrors the input current ($I_{PD}$) from PD 210. The mirrored current ($I_{CM}$) from CM 220 may be equal to or proportional to the first current ($I_{PD}$) from PD 210. In one embodiment, CM 220 is coupled to the anode 212 of PD 210. Nonlinear element 240 generates a first voltage V1 at node 245 from the mirrored current ($I_{CM}$). The circuit 200 may further comprise, in some embodiments, a high-impedance device such a resistor or a switch (e.g., a transistor) at node 215, configured to maintain a unidirectional flow of current and reduce or minimize a reverse flow of current at node 215. The first voltage V1 may be provided to a power processing block (e.g., a RSSI calculator 714 as shown in FIG. 7) and/or other circuitry (not shown) to determine and/or evaluate the received signal strength of the optical signal.

In the embodiment shown in FIG. 2A, amplifier 230 is coupled to the cathode terminal 214 of the PD 210. Amplifier 230 amplifies the electrical signal from PD 210 and generates a second voltage V2 that may be provided downstream for further amplification and/or further processing in an optical transceiver. The amplifier 230 may be any suitable amplifier, such as a transimpedance amplifier (TIA), a limiting amplifier, or a combination thereof. Alternatively, amplifier 230 may provide a current to voltage converting function and/or comprise a single stage amplifier configured to provide a sine wave output, such as a source follower, emitter follower, cascode, or Darlington amplifier.

Figure 2B:
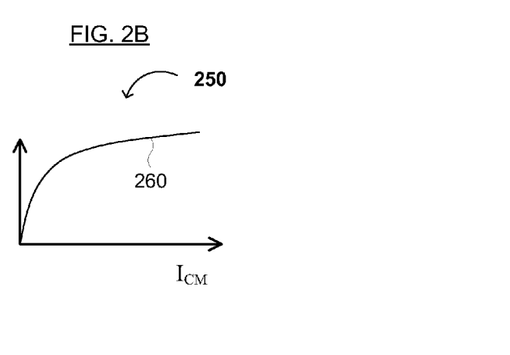
FIG. 2B is a graph showing an exemplary response of a voltage produced by the first exemplary circuit of FIG. 2A as a function of current.

The nonlinear response of nonlinear element 240 provides for improved dynamic range of the optical receiver and/or transceiver. As shown in FIG. 2B, graph 250 shows line 260 representing the gain (e.g., slope) of the first voltage V1 as the mirrored current ($I_{CM}$) increases using circuit 200. In the embodiment of FIGS. 2A-B, the gain as a function of the mirrored current is logarithmic. As shown in graph 250, optical input signals having a relatively low power, corresponding to a relatively low mirrored current ($I_{CM}$), are amplified by nonlinear element 240 at a higher gain, while optical signals having a relatively high power, corresponding to a relatively high mirrored current ($I_{CM}$), are amplified by nonlinear element 240 at a lower gain. The generation of the first voltage V1 using nonlinear element 240 provides a greater dynamic range of operation, and may improve the speed and accuracy of an optical receiver to determine the received signal strength.

Figure 2C:
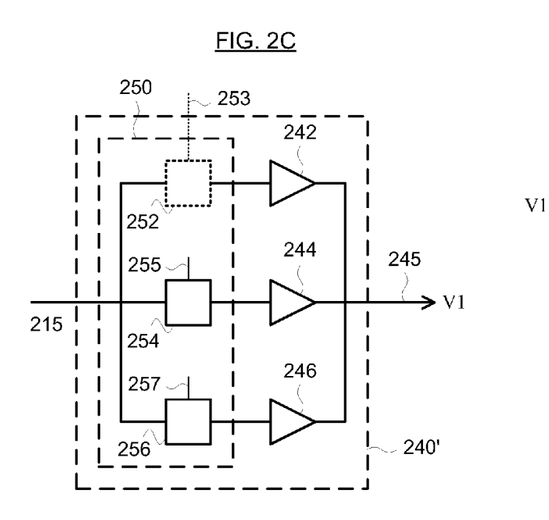
FIG. 2C is a diagram showing an exemplary nonlinear element comprising a segmented linear gain amplifier according to embodiments of the present invention.

The nonlinear element 240 may be any suitable nonlinear amplifier (e.g., an RF detector) configured to generate the first voltage V1. In further embodiments, nonlinear element 240 can comprise a segmented linear gain amplifier. FIG. 2C illustrates an exemplary nonlinear element 240' comprising a segmented linear gain amplifier. The segmented linear gain amplifier 240' may comprise a plurality of parallel linear amplifiers 242, 244 and 246, and a control block 250. Control block 250 comprises control elements 254 and 256, respectively in series with linear amplifiers 244 and 246, and optionally, control element 252 in series with linear amplifier 242. In one embodiment, control elements 254 and 256 each comprise a diode. In this latter embodiment, control element 252 is not necessarily present, and the diodes do not necessarily receive a corresponding control signal 253, 255, 257. In an alternative embodiment, control elements 252, 254 and 256 each comprise a switch or pass gate (e.g., a transistor) configured to receive control signals 253, 255 and 257, respectively.

The segmented linear gain amplifier 240' according to embodiments of the present invention provides for establishing differences in gain according to differences in the received optical power or current generated therefrom. The diodes (e.g., 254 and 256) or switches (e.g., 252, 254 and 256) in exemplary segmented linear gain amplifier 240' may cut off current to the respective linear amplifiers after the current surpasses a predetermined threshold. In one embodiment, the segmented linear gain amplifier 240' can comprise one linear amplifier (e.g., 246) providing a relatively high gain at low power, a second linear amplifier (e.g., 244) providing medium gain at medium power, and a third linear amplifier (e.g., 242) providing low gain at high power. In such an embodiment, when the power level is low, control signal 257 is active and signals 253 and 255 are inactive; when the power level is medium, signal 255 is active and signals 257 and 253 are inactive; and when the power level is high, signal 253 is active and signals 257 and 255 are inactive. Alternatively, the control elements 254 and 256 comprise diodes with different cut off thresholds. In general, the diodes do not receive control signals 255 and 257.

In a further alternative embodiment, linear gain amplifier 240' comprises switches 254 and 256 with respective control signals 255 and 257 (e.g., switch 252 and signal 253 are not present) that control the flow of the mirrored current to amplifiers 244 and 246, respectively. In this further embodiment, amplifier 242 is always on. When the power level is relatively low, control signals 255 and 257 are active, and switches 254 and 256 turn on amplifiers 244 and 246 (in addition to amplifier 242 being on), thereby providing maximum gain. When the power level is at a medium level, control signal 255 is active and control signal 257 is inactive, and so switch 254 turns on amplifier 244, and amplifier 246 turns off. In this configuration, a medium level of gain is provided. When the power level is relatively high, control signals 255 and 257 are inactive, and only amplifier 242 is on, thereby providing a relatively low level of gain. One skilled in the art can determine (e.g., empirically) values of the gain provided by each of the linear amplifiers 242, 244 and 246 in such an embodiment.

Figure 2D:
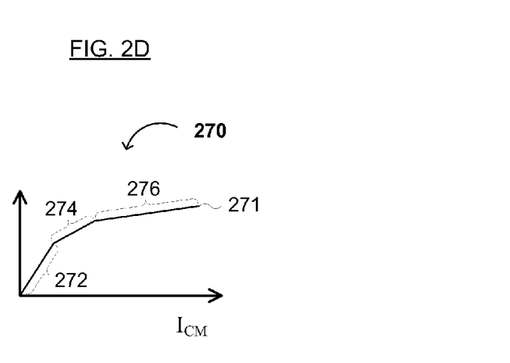
FIG. 2D is a graph showing an exemplary response of a voltage produced by the exemplary circuits of FIGS. 2A and 2C as a function of current.

As shown in FIG. 2D, graph 270 shows line 271 representing the gain (e.g., slope) of the first voltage V1 as the mirrored current ($I_{CM}$) of circuit 200 increases, in which the nonlinear element comprises the segmented linear gain amplifier 240' of FIG. 2C. As shown in graph 270, the gain provided by segmented linear gain amplifier 240' decreases as the mirrored current ($I_{CM}$) increases. At 272, PD 210 receives a low optical power level, corresponding to a relatively low mirrored current ($I_{CM}$). As shown in FIG. 2D, segmented linear amplifier 240' provides a relatively high gain when all three amplifiers 242, 244 and 246 are on, as shown by line segment 272. When PD 210 receives a medium optical power level, corresponding to a medium mirrored current ($I_{CM}$), amplifiers 242 and 244 in segmented linear amplifier 240' provide a relatively medium gain, as shown by line segment 274. When PD 210 receives a high optical power level, corresponding to a high level mirrored current ($I_{CM}$), segmented linear amplifier 240' provides a relatively low gain, as shown by line segment 276 in FIG. 2D.

A Second Exemplary Circuit

Figures 3A, 3B:
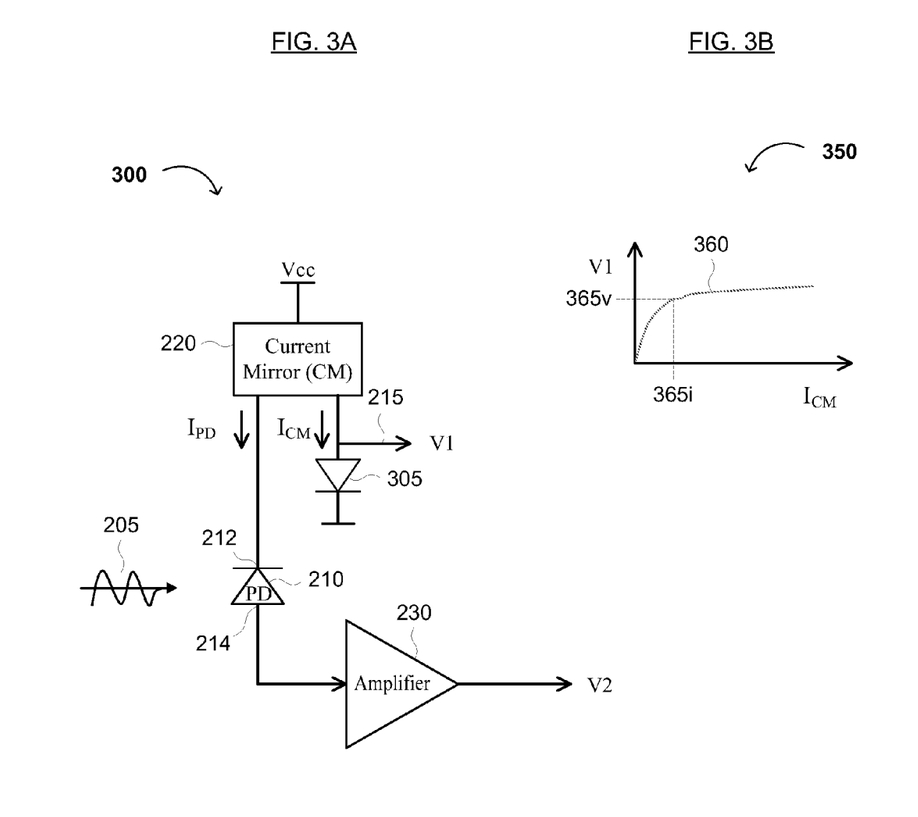
FIG. 3A is a diagram showing a second exemplary circuit according to embodiments of the present invention.
FIG. 3B is a graph showing an exemplary response of a voltage produced by the second exemplary circuit of FIG. 3A as a function of current.

FIG. 3A illustrates exemplary circuit 300 in accordance with the present invention. Circuit 300 may form part of the circuitry and/or components of an optical receiver and/or transceiver. Circuit 300 is similar to circuit 200 of FIG. 2A. However, a diode 305 is coupled at one of its terminals to the current mirror (CM) 220. In one example, the other terminal of diode 305 is grounded (e.g., connected to a ground potential). However, the terminal of diode 305 opposite from the CM 220 can be coupled and/or connected to any node or potential configured to allow a unidirectional flow of current at node 215. The mirrored current ($I_{CM}$) from CM 220 may be equal to or proportional to the first current ($I_{PD}$) from PD 210. As in FIG. 2A, the first voltage V1 is generated at node 215, but using the diode 305 as the nonlinear element.

As shown in FIG. 3B, graph 350 includes a curve 360 representing the change in the first voltage V1 as the mirrored current ($I_{CM}$) increases using circuit 300. As the mirrored current ($I_{CM}$) increases from 0 mA, the first voltage V1 increases relatively rapidly, resulting in a high gain at low currents. However, at the threshold where the diode 305 turns on (i.e., the value of the mirrored current $I_{CM}$ at 365$i$ or the corresponding voltage 365$v$), the gain (e.g., the slope of the first voltage V1 as a function of the mirrored current $I_{CM}$) will generally be about zero (0) at the internal on-resistance of the diode 305 (e.g., typically a few ohms), then it will increase only slightly as the current continues to increase. This relationship between the mirrored current and voltage is also logarithmic, similar to that shown in FIG. 2B. As a result, the generation of the first voltage V1 initially has a relatively high gain for a low mirrored current ($I_{CM}$), but a relatively low gain for a high mirrored current ($I_{CM}$).

A Third Exemplary Circuit

Another embodiment of the present invention relates to a third exemplary circuit in which the nonlinear element comprises a segmented nonlinear resistor configured to produce the first voltage from to the mirrored current. In various embodiments, the segmented nonlinear resistor can comprise one or more diodes and a plurality of resistors. In one embodiment, for example, the segmented nonlinear resistor comprises (i) a first resistor in parallel with a second resistor and (ii) a diode coupled in series to one of the first and second resistors.

Figures 4A, 4B:
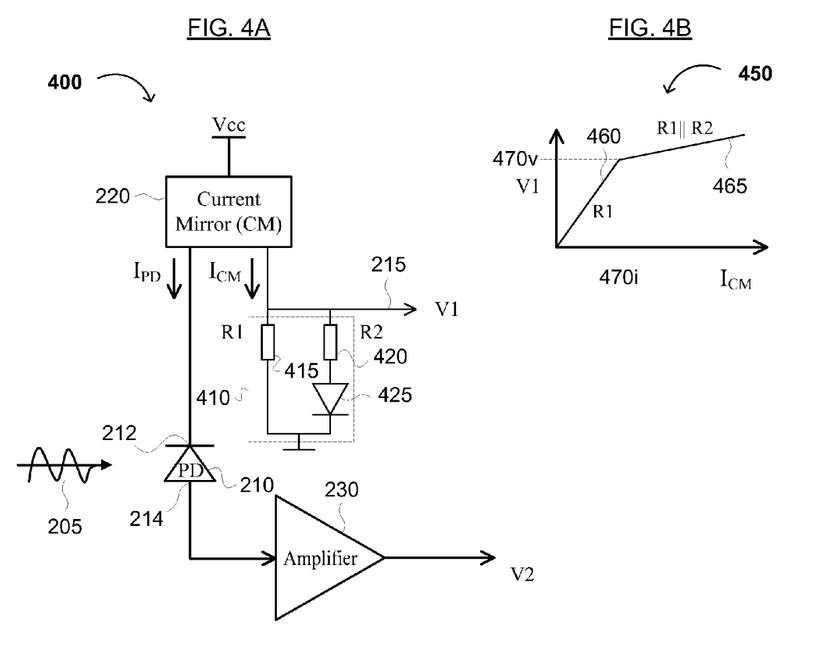
FIG. 4A is a diagram showing a third exemplary circuit according to embodiments of the present invention.
FIG. 4B is a graph showing an exemplary response of a voltage produced by the third exemplary circuit of FIG. 4A as a function of current.

As shown in FIG. 4A, circuit 400 illustrates a further embodiment of the present invention. Circuit 400 may form part of the circuitry and/or components of an optical receiver and/or transceiver. Circuit 400 comprises PD 210, CM 220, a segmented nonlinear resistor 410 (as described below) and amplifier 230. The PD 210, CM 220, and amplifier 230 may be as described above for circuit 200 of FIG. 2A.

The segmented nonlinear resistor 410 generates a first voltage V1 from the mirrored current ($I_{CM}$) at node 215. The segmented nonlinear resistor 410 may comprise a plurality of resistive segments, each comprising one or more resistances and, optionally, one or more diodes. However, in such embodiments, at least one resistive segment includes at least one resistance and at least one diode. As shown in circuit 400, the segmented nonlinear resistor 410 may comprise a first segment (e.g., a first resistance 415) in parallel with a second resistive segment (e.g., a second resistance 420 and diode 425 in series with the second resistance 420).

The present segmented nonlinear resistor 410 may comprise any number of resistive segments (e.g., comprising N resistances and N−1 diodes [where N equals the number of segments]), where each segment is in parallel between node 215 and a voltage or potential configured to maintain a unidirectional current flow at node 215. In FIG. 4A, both segments (e.g., first resistance 415 and diode 425) are connected to a ground potential. Resistances 415 and 420 may comprise a resistor, a resistively-configured transistor (e.g., with the gate connected to a fixed potential), or other device having a characteristic, and preferably fixed, resistance.

As shown in FIG. 4B, graph 450 shows line segments 460 and 465 representing the change in the first voltage V1 as the mirrored current $I_{CM}$ increases in circuit 400. Line segment 460 represents the first voltage at relatively low current values, when the diode 425 is off and the gain (e.g., slope) is relatively high and proportional to the resistance of the first resistance 415. As the mirrored current $I_{CM}$ increases, the diode 425 eventually turns on (i.e., at current value 470$i$ and/or the corresponding voltage 470$v$), and the gain decreases in proportion to the parallel resistances of the first and second resistors 415 and 420, as indicated by the line segment 465.

Figure 4C:
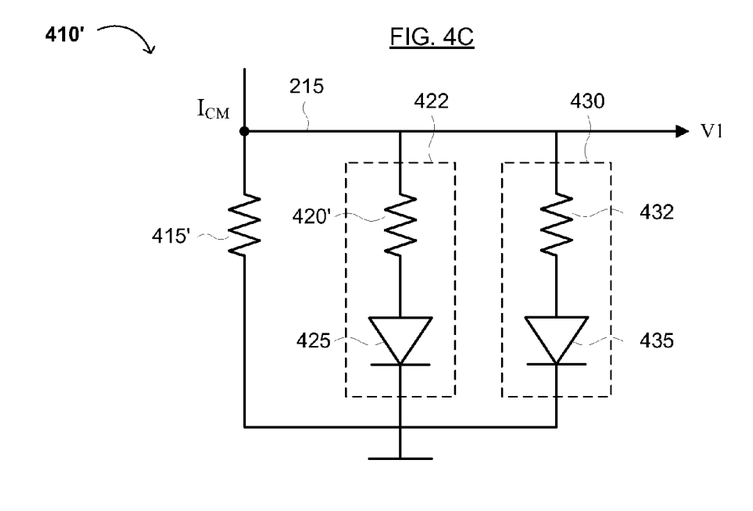
FIG. 4C is a diagram showing a further exemplary segmented nonlinear resistor according to an embodiment of the present invention.

FIG. 4C illustrates a segmented nonlinear resistor 410' comprising three resistive segments (e.g., comprising a plurality of resistors and a plurality of diodes). The present segmented nonlinear resistor 410' may comprise any number of resistive segments (e.g., comprising N resistors and N−1 diodes [where N equals the number of segments] and where each segment is in parallel between node 215 and a ground potential). As shown in FIG. 4C, the segmented nonlinear resistor 410' comprises a first resistive segment (e.g., resistor 415'), a second resistive segment 422 (e.g., resistor 420' and diode 425 in series), and a third resistive segment 430 (e.g., resistor 432 and diode 435 in series). Diodes 425 and 435 have different turn-on thresholds to enable the different resistive segments 422 and 430 to activate at different times. The resistances of resistors 415', 420 and 432 generally also differ from each other, to enable tailoring the gains provided by the various segments to the desired values. The gain-vs.-current curve provided by the segmented nonlinear resistor 410' generally follows the 3-stage curve of FIG. 2D.

Further embodiments of the present invention, and in particular, further configurations of the segmented nonlinear resistor, allow for the gain of the response of the circuit to be tailored to the operational requirements of the optical network, the optical receiver and/or transceiver, and/or the manufacturer and/or user. Various segmented linear resistor configurations can be implemented by adding additional segments (e.g., diodes and resistors) suitably configured to generate the desired gain and/or response of the first voltage V1 as a function of the mirrored current $I_{CM}$.

A Fourth Exemplary Circuit

Another embodiment of the present invention relates to a fourth exemplary circuit in which the nonlinear element comprises a passive nonlinear device and an operational amplifier configured to determine a voltage differential across the nonlinear device. In one embodiment, for example, the passive nonlinear device comprises a diode and, optionally, a resistor.

Figure 5:
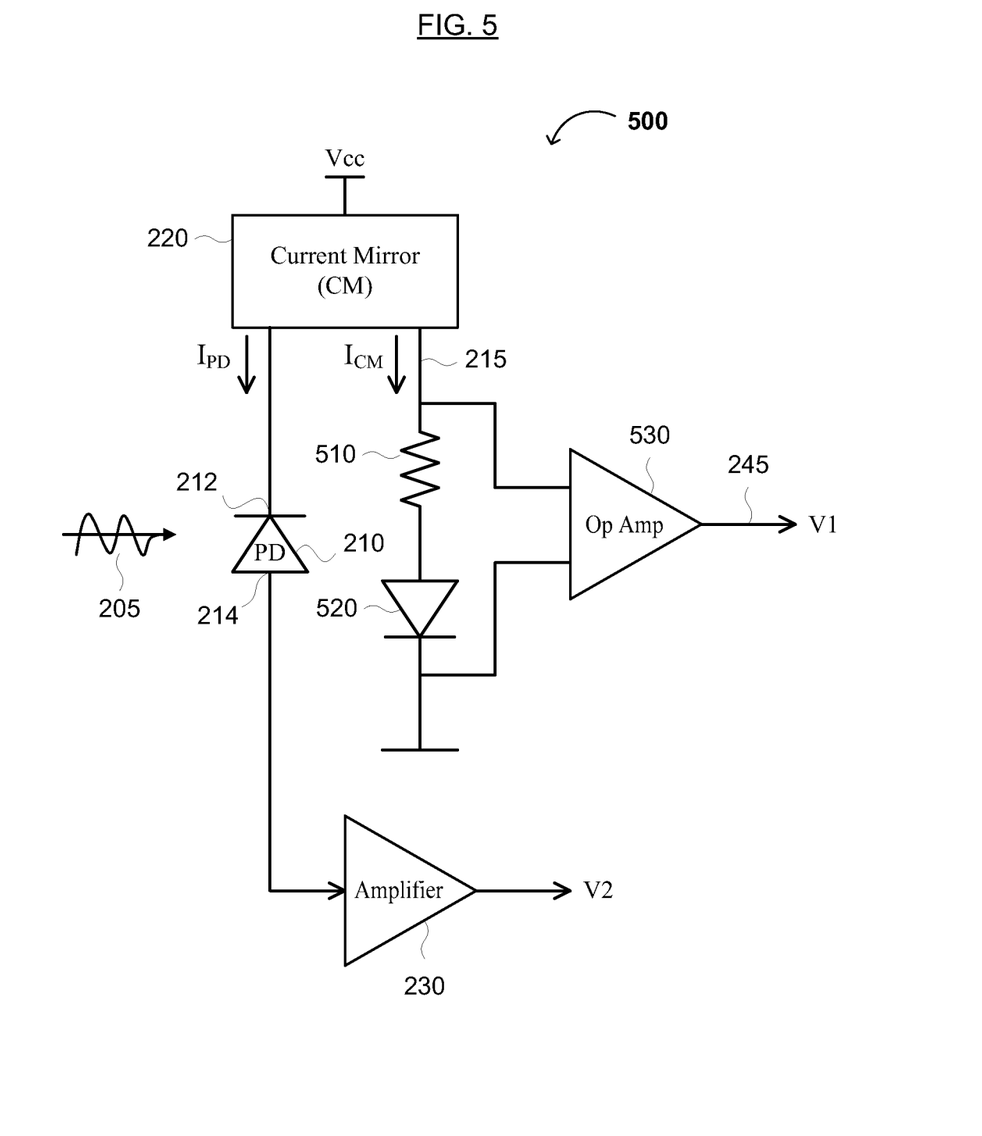
FIG. 5 is a diagram showing a fourth exemplary circuit according to embodiments of the present invention.

As shown in FIG. 5, circuit 500 illustrates a further embodiment of the present invention. Circuit 500 may form part of the circuitry and/or components of an optical receiver and/or transceiver. Circuit 500 comprises PD 210, CM 220, amplifier 230, a passive nonlinear device (e.g., diode 520), resistor 510 and an operational amplifier 530. The PD 210 and amplifier 230 may be as described above, and diode 520 can comprise one or more diodes as described herein. Resistor 510 can also comprise one or more resistivity-configured passive devices, as is known in the art. Operational amplifier 530 can be a differential amplifier, a comparator, or other circuit configured to output a voltage related to the voltage differential across the passive nonlinear element.

The mirrored current ($I_{CM}$) from CM 220 may be equal to or proportional to the first current ($I_{PD}$) from PD 210. Operational amplifier 530 generates a first voltage V1 proportional to the voltage differential across the resistor 510 and the diode 520 from mirrored current $I_{CM}$. Alternatively, operational amplifier 530 generates a first voltage V1 proportional to the voltage differential across diode 520 alone. Diode 520 remains on until the mirrored current $I_{CM}$ reaches a threshold and then diode 520 turns off. The voltage-vs.-current curve using diode 520 is logarithmic, and generally follows the curve of FIG. 3B.

A Fifth Exemplary Circuit

Another embodiment of the present invention relates to a fifth exemplary circuit, comprising a photodiode configured to generate (i) an electrical signal and (ii) a first current in response to an optical signal, a nonlinear element coupled to the photodiode and configured to generate a first voltage from the first current, and a first amplifier configured to amplify the electrical signal from the photodiode.

Figure 6:
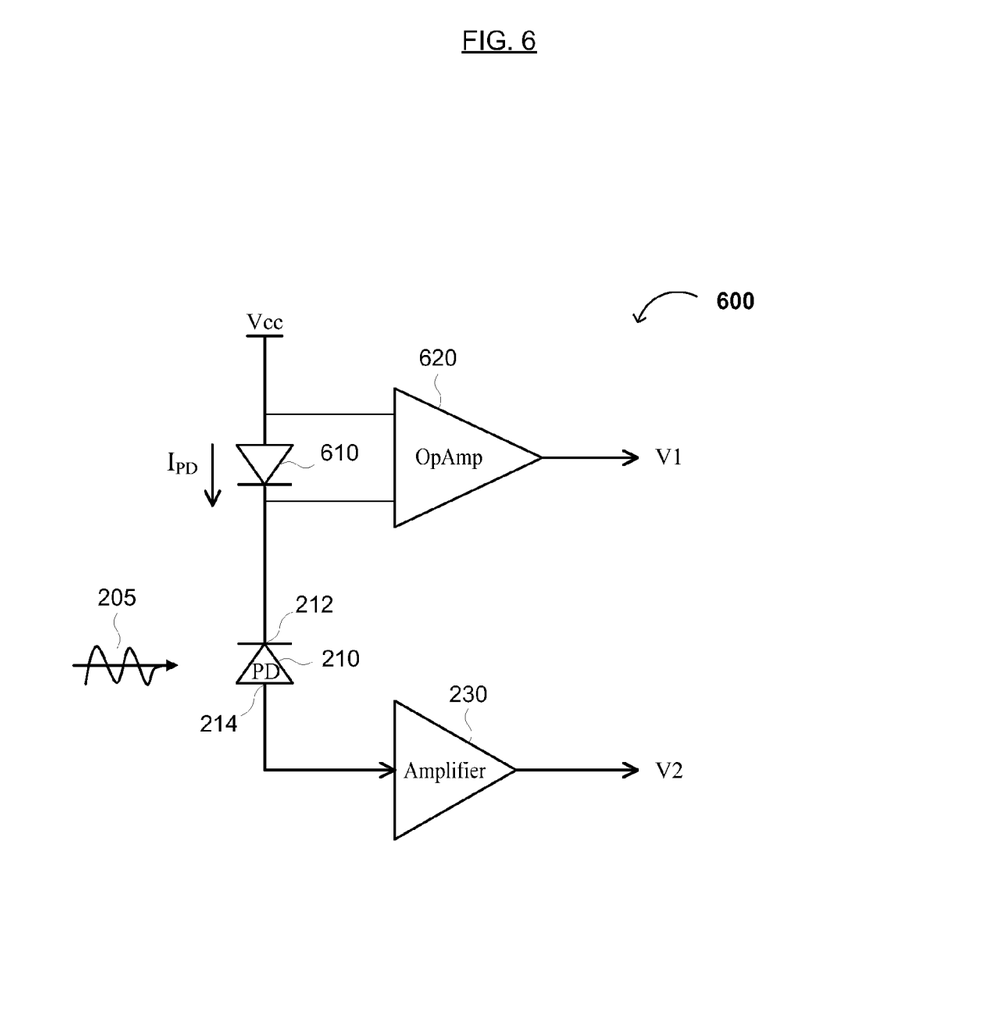
FIG. 6 is a diagram showing a fifth exemplary circuit according to embodiments of the present invention.

FIG. 6 illustrates an exemplary circuit in accordance with this embodiment of the present invention. Circuit 600 may form part of the circuitry and/or components of an optical receiver and transceiver. Circuit 600 comprises PD 210, amplifier 230, a passive nonlinear element, and operational amplifier 620. The PD 210 and amplifier 230 may be as described above, and the passive nonlinear element can comprise one or more diodes 610, as described herein. The passive nonlinear element may further comprise one or more resistors in series with the diode 610, as described herein with reference to the embodiment of FIG. 5, although not shown in FIG. 6. Operational amplifier 620 can be a differential amplifier, a comparator, or another circuit configured to output a voltage related to the voltage differential across the passive nonlinear element.

As for FIGS. 2-5, PD 210 converts a received optical signal 205 from one or more external components (such as one or more OLTs and/or ONUs) in a network into (i) an electrical signal at terminal 214 and (ii) a current $I_{PD}$ across passive nonlinear element 610. Amplifier 620 generates a first voltage proportional to the voltage differential (which is, in turn, a nonlinear function of the current [$I_{PD}$] generated by PD 210) across diode 610. The current $I_{PD}$ across the passive nonlinear element 610 creates the voltage differential across nonlinear element 610. In general, the curve of the output voltage V1 as a function of current $I_{PD}$ for this method is similar to that shown in FIGS. 2B and/or 3B.

Exemplary Optical Transceiver

A further aspect of the present invention relates to an optical receiver or transceiver comprising (i) an optical receiver assembly or sub-assembly, configured to connect and/or couple to a fiber carrying optical information, (ii) one of the circuits discussed above, and (iii) logic configured to determine or calculate a signal strength value and/or a link budget from (1) the first voltage and/or (2) a second voltage at an output of an amplifier receiving the electrical signal from the photodiode.

FIG. 7A illustrates an exemplary optical transceiver 700 in accordance with embodiments of the present invention. Optical transceiver 700 is capable of calculating and/or monitoring its own received signal strength indication, dynamic power, link budget, as well as that from other optical transmitter(s) and/or transceiver(s) in the network from which it receives optical communications and/or signals. As shown, optical transceiver 700 comprises transmitter optical sub-assembly (TOSA) 710, laser driver circuit 720, microprocessor/microcontroller (MCU) 730, amplifier 740, laser bias current control circuit 750, interface 760, receiver optical sub-assembly (ROSA) 770, nonlinear element 240, and current mirror (CM) 220.

Optical transceiver 700 transmits optical data via optical signal 712A to external media (e.g., fiber optic cable) and/or components (e.g., optical splitters, optical transceivers and/or other suitable hardware) in the optical network. TOSA 710 facilitates the generation and transmission of optical signals from transceiver 700. TOSA 710 comprises laser diode (LD) 715 and optional PD 717. In various embodiments, PD 717 may be a PIN diode or an avalanche photodiode. The transmitter portion of optical transceiver 700 may further comprise laser driver 720 and laser bias current control circuit 750. Laser driver 720 sends modulated electrical signals to LD 715. Laser bias current control circuit 750, which is coupled to TOSA 710, controls a bias current to the LD 715.

When LD 715 emits an optical signal 712A, a portion 712B of the optical signal (e.g., light) is detected by PD 717. PD 717 converts optical signal portion 712B into a current that is transmitted to the CM 220. CM 220 transmits a mirrored current to nonlinear element 240 for the generation of the first voltage V1. Nonlinear element 240 can be the segmented linear amplifier 240' in FIG. 2C, diode 305 of FIG. 3A, the segmented nonlinear resistor 410 in FIG. 4A and/or 410' in FIG. 4C, or resistor 510, diode 520, and operational amplifier 530 in FIG. 5.

ROSA 770 converts incoming optical signals 205 into electrical signals. ROSA 770 comprises PD 214 and may further comprise an amplifier 230 (see, e.g., FIGS. 2A, 3A, 4A, 5 and 6). In one embodiment, amplifier 230 may comprise a TIA or a single stage amplifier configured to provide a sine optical wave form, such as a source follower, emitter follower, cascade or Darlington amplifier. PD 214 also generates a current to be replicated or mirrored by CM 220. In one embodiment, current mirror 220 may have separate terminals for separate currents to or from TOSA 710 and ROSA 770. Alternatively, CM 220 may comprise separate current mirrors for processing the separate signals from TOSA 710 and ROSA 770, and nonlinear element 240 may comprise separate detectors for determining the first voltage V1, in which case suitably configured pass gates and/or multiplexers may be used in conjunction with the separate current mirrors and/or detectors to enable separate processing of signals from TOSA 710 and ROSA 770.

As described above, PD 214 generates a first current (e.g., $I_{PD}$) that is replicated by CM 220 to produce a second current ($I_{CM}$), which is equal or proportional to the first current ($I_{PD}$). First voltage V1 is generated using nonlinear element 240. MCU 730 may process power-related data from TOSA 710 and ROSA 770 separately (e.g., by time-multiplexing), or receive separate signals from separate detectors and current mirrors configured to process separate data from TOSA 710 and ROSA 770.

As shown in FIG. 7A, ROSA 770 may further transmit an electrical signal, which comprises the electrical signal equivalent of optical signal 205, via node 716 to amplifier 740, which then transmits an amplified electrical signal on node 785 to electrical interface 760. Amplifier 740 can be configured to amplify and/or limit the voltage of electrical signal 716 (e.g., to within a predetermined voltage range). In one embodiment, amplifier 740 may be a limiting amplifier, but alternatively, amplifier 740 may be a TIA, or a single-stage amplifier configured to output a sinusoidal wave form.

In further embodiments, MCU 730 may comprise logic (e.g., RSSI calculator 714) to determine and/or calculate various measurements, such as received signal strength, dynamic range, and/or a link budget. In other embodiments, RSSI calculator 714 may be coupled to MCU 730 and may determine the received signal strength and generate an RSSI value, then transmit the RSSI data to MCU 730. MCU 730 may further comprise a central processing unit (CPU) or microprocessor. In alternate embodiments, MCU 730 may comprise an application-specific integrated circuit (ASIC), a field programmable logic device (PLD), a complex programmable logic device (CPLD), or a system-on chip (SOC). MCU 730 may further comprise a memory 712 (e.g., for storing instructions, configuration data, parametric data being processed, state information, etc.).

In various embodiments, MCU 730 may communicate with TOSA 710, ROSA 770, interface 760, laser driver circuit 720, and laser bias current control circuit 750. MCU 730 may be responsible for (i) controlling the flow of data and directing where to store data in memory (e.g., memory 712), (ii) determining or calculating parametric values (such as RSSI, dynamic range, and link budget), (iii) setting and/or transmitting states and/or flags representing operational states of the transceiver 700 based on such parametric data, and/or (iv) controlling the overall flow for processing optical data received and transmitted by optical transceiver 700.

Optical transceiver 700 may communicate via interface 760 with a network and/or host, which can be a host processor, circuit board, stand-alone optical network device (e.g., a repeater, optical switch, set-top box, etc.) or any other component or device including a controller or processor configured to communicate and/or control at least some aspects of the transceiver 700 and/or the network. In one embodiment, the host and/or network may communicate via interface 760 to request state information and/or flags from the optical transceiver 700 and/or provide thresholds for such state information and/or flags to the optical transceiver 700. For example, the state information and flags may relate to states and/or operational ranges of the power-related parametric data, such as RSSI within a normal range, a RSSI, dynamic range and/or link budget that is outside a predetermined operational threshold, or parametric data within an acceptable, but potentially problematic, range (e.g., a "warning" state or flag).

Figure 7B:
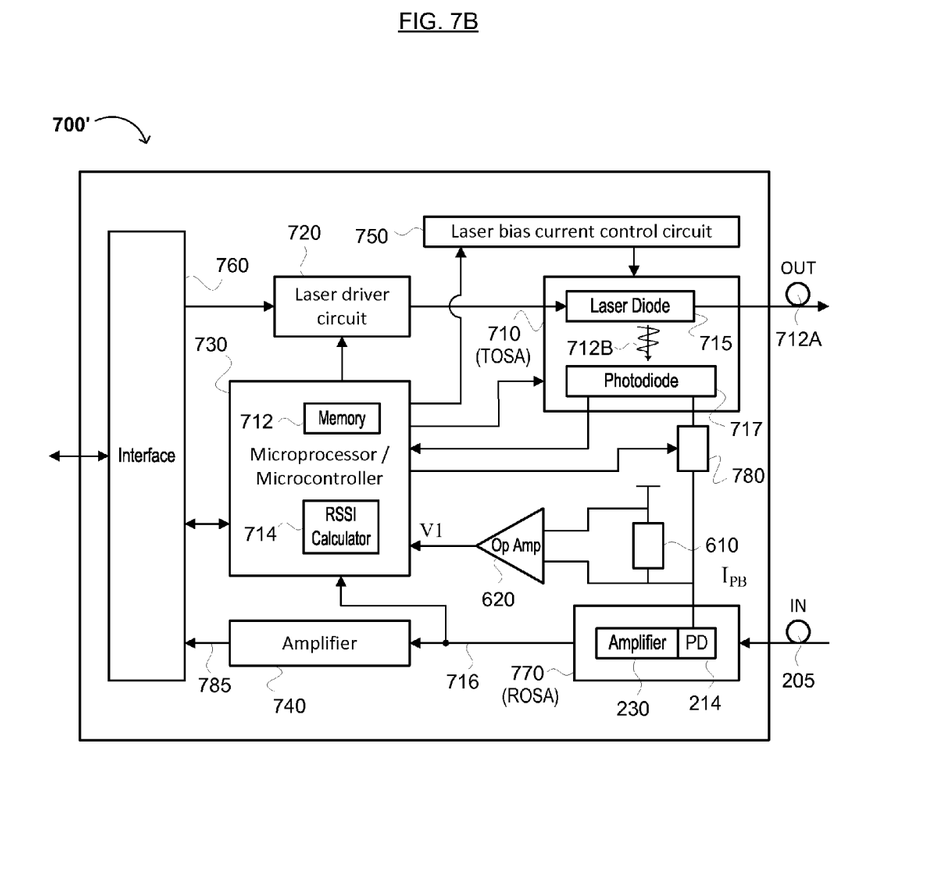
FIG. 7B is a diagram showing a second exemplary optical transceiver according to embodiments of the present invention.

In an alternative embodiment, shown as optical transceiver 700' in FIG. 7B, PD 717 converts optical signal portion 712B into a current ($I_{PD}$) that is applied across passive nonlinear element 610. The current $I_{PD}$ across the passive nonlinear element 610 creates a voltage differential across nonlinear element 610. Amplifier 620 generates a first voltage from the voltage differential. Optical transceiver 700' in FIG. 7B may further comprise switch 780, wherein switch 780 permits sampling and/or testing of the internal LD 715 when network transmissions are not occurring (i.e., there is no activity in ROSA 770). Alternatively, a second switch (not shown) between PD 214 and passive nonlinear element 610 may permit separate or isolated sampling and/or testing of the optical signals received by PD 214 or by photodiode 717 during times of network activity.

Exemplary Method for Monitoring One or More Optical Transceivers

Another aspect of the present invention relates to a method for monitoring one or more optical transceivers, the method comprising receiving and/or sending one or more optical signals, converting the optical signal(s) to a first current, converting the first current into a first voltage using a nonlinear element, and calculating a received signal strength, a dynamic range, and/or a link budget based on at least the first voltage.

Figure 8:
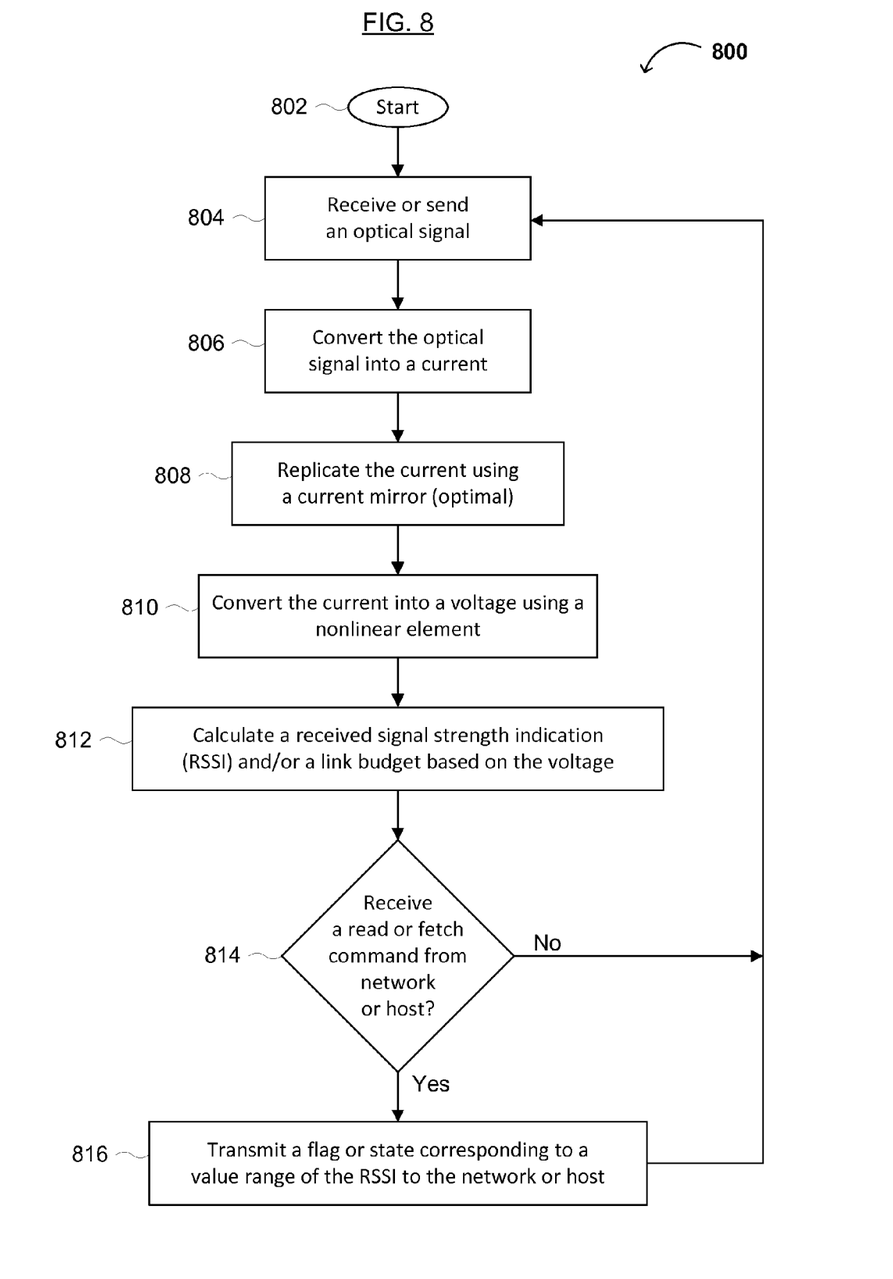
FIG. 8 is a flow diagram showing an exemplary method for monitoring one or more optical signals in an optical transceiver in accordance with embodiments of the present invention.

FIG. 8 illustrates an exemplary method 800 for monitoring one or more optical transceivers according to the present invention. The method typically involves continuous processing through various loops in the flow, although it also encompasses a single pass through part or all of the flow. For example, in the method, upon stable application of power, an optical transceiver continuously receives optical transmissions from the network of which it is part (e.g., as an optical line terminal [OLT] 105 and/or as an optical network unit [ONU] 125), and continuously processes received signal strength indications and link budget information until the network and/or optical transceiver is powered down.

As shown, the method may begin at 802, and at 804, the optical transceiver receives or sends an optical signal. For example, an optical transceiver may transmit an optical signal using a laser diode and/or receive an optical transmission using a photodiode. Different wavelengths are commonly used to send and receive optical signals. For example, an optical transceiver may transmit downstream optical signals to other devices (e.g., OLT 105 and/or ONUs 125*a-n*) in the optical network at a wavelength of 1577 nm, while receiving upstream optical signals at a wavelength of 1310 nm.

At 806, the optical signal is converted into a current. In one embodiment, the optical signal is generally converted into at least one current by a photodiode. In another embodiment, the current is generated using a current mirror. Optionally, at 808, the current (e.g., generated by the PD) is replicated or mirrored by a current mirror. The electrical signal from the photodiode may further be converted into a second voltage using an amplifier (e.g., a transimpedance amplifier).

At 810, the optical transceiver converts the current into a first voltage using a nonlinear element. In one embodiment, the replicated or mirrored current may be converted into the first voltage by the nonlinear element. The nonlinear element in such a case may be a logarithmic amplifier, a segmented linear amplifier, a passive nonlinear device, or a segmented nonlinear resistor. In another embodiment, the current is across a passive nonlinear element (e.g., diode 610) coupled to a terminal of the photodiode, and the first voltage is generated by an operational amplifier (e.g., amplifier 620 in FIG. 6) generating a first voltage from the voltage differential across the passive nonlinear element.

At 812, the voltage is used to calculate a received signal strength value (e.g., "received signal strength" is an expression of the power of an optical signal, and may be expressed using the general power equation P=V×I) and/or a link budget (e.g., a "link budget" evaluates the gains and losses from a transmitter to a receiver and can be determined using the general equation Received Power=Transmitted Power+ Gains−Losses [e.g., measured in dB]). In a further example, if a read command (e.g., to read the calculated RSSI and/or link budget) is not received from the network (e.g., an optical network) or host, then at 814, the method 800 continues to receive and/or send one or more optical signals at 804, convert the optical signal into a current at 806, convert the current into a voltage using a nonlinear element at 810, and determine RSSI and/or link budget information at 812, in a continuous loop. However, when a read or fetch command is received by the optical transceiver at 814, the optical transceiver may transmit a flag or state corresponding to a value range of the RSSI and/or link budget of the optical signal(s) at 816. For example, a state controller can provide a state (e.g., a bit string representation of the value of a parameter, such as RSSI, dynamic power, or link budget) within a particular range, such as "normal," "high," "low," etc.

In further embodiments, at 816, one or more parametric values may be compared with one or more thresholds representing a particular flag or state, and the corresponding flag or state is generated to indicate the status of the power-related parameter(s). The flag or state may then be transmitted to the network or host. The state may be directly transmitted to the host via a communications interface, or retrieved from data memory and then transmitted to the host. The method then returns to 804, and may operate continuously until suspended (e.g., in a power-down operation) or ended (e.g., by powering the transceiver and/or network off).

CONCLUSION/SUMMARY

Thus, the present invention provides a circuit, an optical transceiver, and/or methods for monitoring various power-related parameters in an optical transceiver(s). Embodiments of the present invention generally relate to a circuit, optical transceiver and/or component(s) thereof, and methods of determining and/or monitoring the received signal strength, dynamic range, and/or link budget and/or improving the dynamic range of an optical transceiver. Embodiments of the present invention provide for a circuit, an optical transceiver and/or components thereof, and a method for increase the dynamic range and improve monitoring various power-related parameters using one or more non-linear devices. The optical transceiver including such circuitry and/or capable of practicing such method(s) may monitor itself or a remote transceiver.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit, comprising:
   (a) a photodiode configured to generate a first current and an electrical signal responsive to an optical signal;
   (b) a current mirror configured to produce a second current equal to or proportional to the first current;
   (c) a nonlinear element configured to produce a first voltage from the second current;
   (d) an amplifier configured to produce a second voltage in response to the electrical signal; and
   (e) a processor coupled to receive the first voltage and the second voltage, configured to determine or calculate a link budget from the first voltage and the second voltage.

2. The circuit of claim 1, wherein the nonlinear element comprises a logarithmic amplifier.

3. The circuit of claim 1, wherein the nonlinear element comprises a gain amplifier.

4. The circuit of claim 1, wherein the nonlinear element comprises a first diode.

5. The circuit of claim 1, wherein the nonlinear element comprises a segmented linear amplifier.

6. The circuit of claim 1, wherein the nonlinear element comprises a segmented nonlinear resistor.

7. The circuit of claim 6, wherein the segmented nonlinear resistor comprises a plurality of parallel resistive segments.

8. The circuit of claim 6, wherein the segmented nonlinear resistor comprises one or more diodes and a plurality of resistors.

9. The circuit of claim 8, wherein the segmented nonlinear resistor comprises:
   a first resistive segment comprising a first resistor; and
   a second resistive segment, comprising a second resistor and a second diode in series with the second resistor.

10. An optical transceiver, comprising an optical receiver including the circuit of claim 1 and a laser diode coupled to the processor, wherein the photodiode is configured to receive optical information from a remote transceiver.

11. The circuit of claim 10, wherein the amplifier comprises a transimpedance amplifier.

12. The circuit of claim 10, further comprising a laser driver circuit coupled to the laser diode and the processor.

13. The circuit of claim 1, wherein the nonlinear element comprises a passive nonlinear device and an operational amplifier configured to determine a voltage differential across the nonlinear device.

14. The circuit of claim 13, wherein passive nonlinear device comprises a diode.

15. A circuit, comprising:
   a) a photodiode configured to generate, in response to an optical signal, (i) an electrical signal and (ii) a first current;
   b) a nonlinear element coupled to the photodiode and configured to produce a first voltage from the first current;
   c) a first amplifier configured to amplify the electrical signal and produce a second voltage; and
   d) a processor coupled to receive the first voltage and the second voltage, configured to determine or calculate a link budget from the first voltage and the second voltage.

16. The circuit of claim 15, wherein the nonlinear element comprises:
   a) a passive nonlinear device coupled between a terminal of the photodiode and a power supply; and
   b) an operational amplifier configured to detect a voltage differential across the passive nonlinear device and output the first voltage therefrom.

17. The circuit of claim 16, wherein the passive nonlinear device comprises a diode.

18. The circuit of claim 16, further comprising a second amplifier receiving an output of the first amplifier.

19. A method for monitoring one or more optical transceivers, the method comprising:
   (a) receiving and/or sending one or more optical signals;
   (b) converting the optical signal(s) into a first current and an electrical signal using a current mirror;
   (c) converting the first current into a first voltage using a nonlinear element;
   (d) producing a second voltage from the electrical signal using an amplifier; and
   (e) calculating a link budget using the first voltage and the second voltage.

20. The method of claim 19, further comprising calculating the received signal strength, wherein the method further comprises transmitting a first flag and/or state corresponding to a value range of the received signal strength to a network or host.

21. An optical transceiver, comprising:
   a) an optical receiver including the circuit of claim 1, wherein the photodiode is configured to receive optical information from a remote transceiver; and
   b) a transmitter, comprising a laser diode coupled to the processor.

22. The method of claim 20, further comprising transmitting a second flag and/or state corresponding to a value range of the link budget to the network or host.

* * * * *